US012574896B2

(12) United States Patent　　(10) Patent No.:　US 12,574,896 B2

Sogabe et al.　　(45) Date of Patent:　Mar. 10, 2026

(54) BASE STATION AND WIRELESS COMMUNICATION METHOD

(71) Applicants: DENSO CORPORATION, Kariya (JP); TOYOTA JIDOSHA KABUSHIKI KAISHA, Toyota (JP)

(72) Inventors: Haruhiko Sogabe, Kariya (JP); Hideaki Takahashi, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 18/351,805

(22) Filed: Jul. 13, 2023

(65) Prior Publication Data

US 2023/0371004 A1　　Nov. 16, 2023

Related U.S. Application Data

(63) Continuation of application No. PCT/JP2022/001214, filed on Jan. 14, 2022.

(30) Foreign Application Priority Data

Jan. 14, 2021　(JP) ................................. 2021-004107

(51) Int. Cl.
　H04W 68/02　　(2009.01)
　H04W 76/28　　(2018.01)
(52) U.S. Cl.
　CPC ........... H04W 68/02 (2013.01); H04W 76/28 (2018.02)

(58) Field of Classification Search
CPC . H04W 68/02; H04W 76/28; H04W 52/0235; H04W 52/028; H04W 52/0216; H04W 68/00; H04W 76/27; H04W 92/20
See application file for complete search history.

(56) References Cited

U.S. PATENT DOCUMENTS

| | | | |
|---|---|---|---|
| 2019/0313475 A1 | 10/2019 | Siomina et al. | |
| 2022/0078872 A1* | 3/2022 | Shrestha ............... | H04W 68/12 |
| 2023/0119167 A1* | 4/2023 | Niu ........................ | H04W 76/28 |
| | | | 455/458 |
| 2023/0254769 A1* | 8/2023 | Shi ....................... | H04W 68/005 |
| | | | 370/311 |
| 2023/0354266 A1* | 11/2023 | Xiang .................... | H04W 68/02 |

(Continued)

FOREIGN PATENT DOCUMENTS

| | | |
|---|---|---|
| EP | 3897042 A1 | 10/2021 |
| EP | 4203573 A1 | 6/2023 |
| WO | 2020118726 A1 | 6/2020 |

OTHER PUBLICATIONS

U.S. Appl. No. 18/351,873, filed Jul. 13, 2023, Sogabe, et al.

(Continued)

*Primary Examiner* — Abdullahi Ahmed

(74) *Attorney, Agent, or Firm* — Harness, Dickey & Pierce, P.L.C.

(57)　　ABSTRACT

A base station includes a control unit that controls radio access network (RAN) paging processing for a terminal in a radio resource control inactive (RRC_INACTIVE) state and a transmitting unit that transmits, to any other base station connected by a given interface, RAN paging information elements including configuration information for extended discontinuous reception (eDRX) in the RAN paging processing for the terminal.

8 Claims, 14 Drawing Sheets

(56) References Cited

U.S. PATENT DOCUMENTS

| | | | |
|---|---|---|---|
| 2023/0379880 A1* | 11/2023 | Park | H04W 68/02 |
| 2024/0057210 A1* | 2/2024 | Li | H04W 52/028 |

OTHER PUBLICATIONS

U.S. Appl. No. 18/351,980, filed Jul. 13, 2023, Sogabe, et al.
3GPP TS 38.300 V15.11.0 (Sep. 2020).
3GPP TS 36.300 V15.12.0 (Dec. 2020).
ZTE, Qualcomm Incorporated, Correction on the DRX information delivery for RRC_Inactive UE[online], 3GPP TSG RAN WG3 #111-e R3-210206, Jan. 15, 2021.
Huawei et al., "Discussion on eDRX for RRC_Inactive and RRC_Idle", Document R2-2007346, 3GPP TSG RAN WG2 #111-e, Aug. 17-28, 2020.

* cited by examiner

PROCESSOR 11

COMMUNICATION DEVICE 13

STORAGE DEVICE 12

INPUT/OUTPUT DEVICE 14

Figure 8:
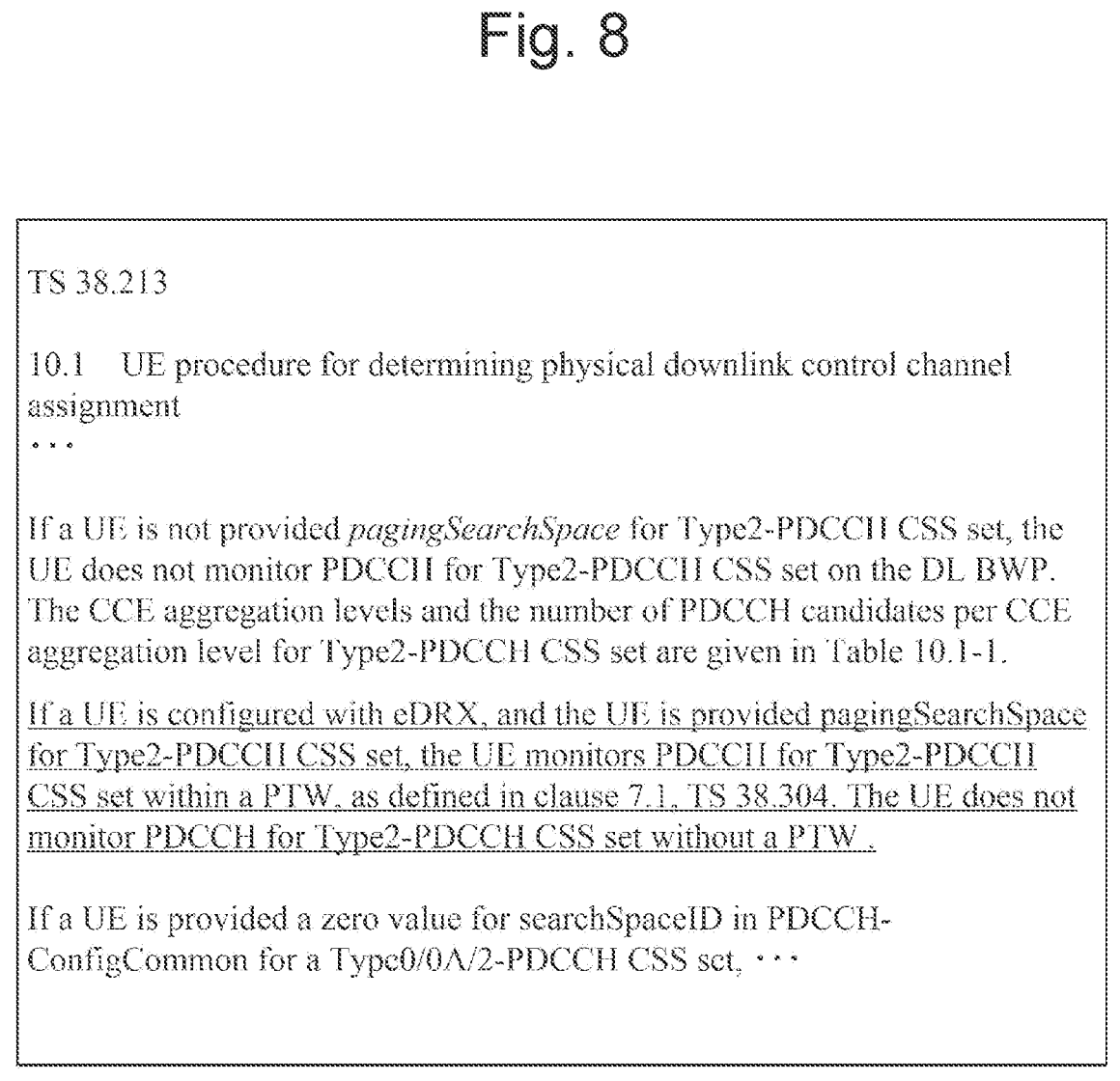

10.1    UE procedure for determining physical downlink control channel assignment

. . .

If a UE is not provided *pagingSearchSpace* for Type2-PDCCH CSS set, the UE does not monitor PDCCH for Type2-PDCCH CSS set on the DL BWP. The CCE aggregation levels and the number of PDCCH candidates per CCE aggregation level for Type2-PDCCH CSS set are given in Table 10.1-1.

If a UE is configured with eDRX, and the UE is provided pagingSearchSpace for Type2-PDCCH CSS set, the UE monitors PDCCH for Type2-PDCCH CSS set within a PTW, as defined in clause 7.1, TS 38.304. The UE does not monitor PDCCH for Type2-PDCCH CSS set without a PTW .

If a UE is provided a zero value for searchSpaceID in PDCCH-ConfigCommon for a Type0/0A/2-PDCCH CSS set, . . .

Figure 9:
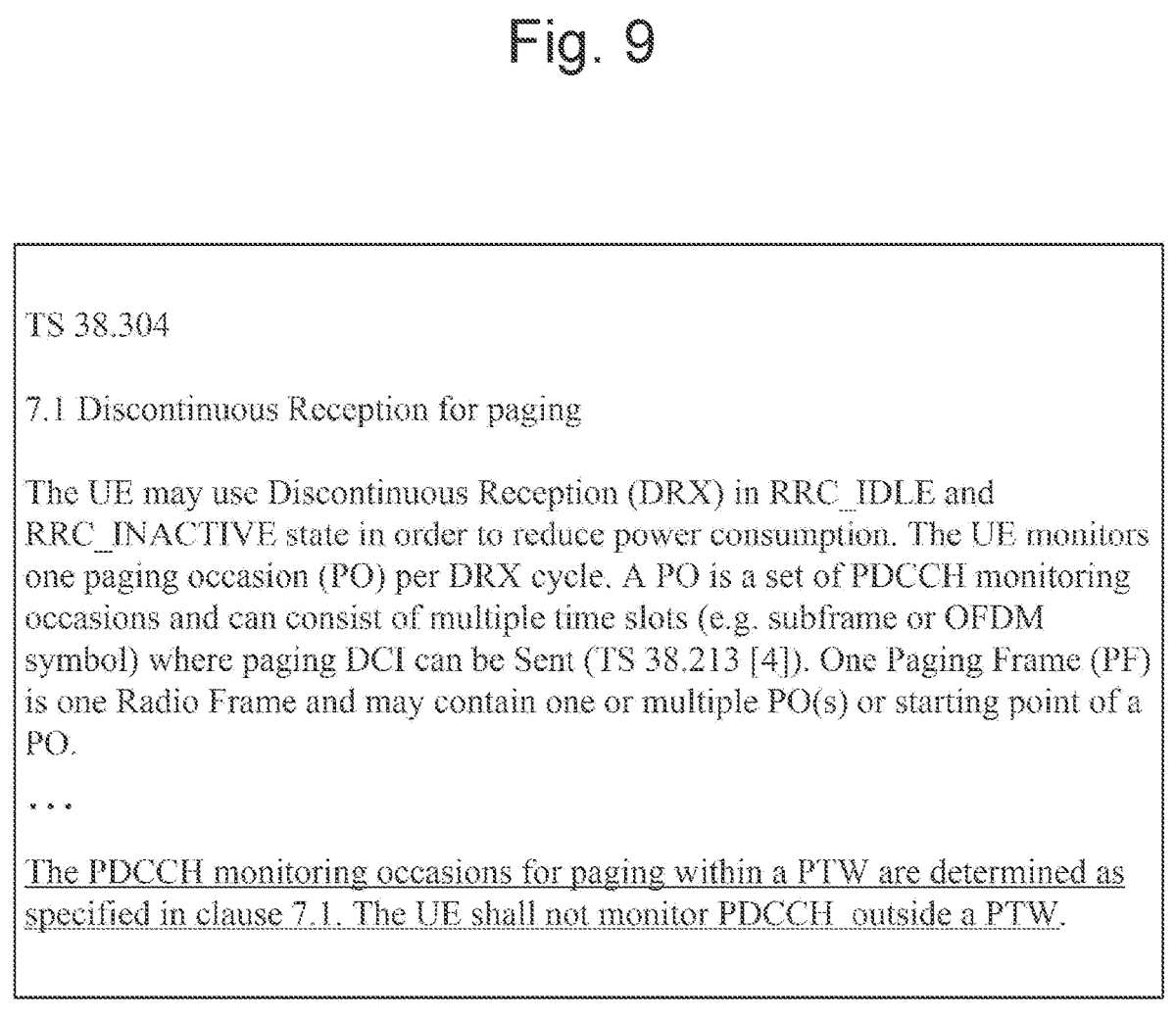

7.1 Discontinuous Reception for paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be Sent (TS 38.213 [4]). One Paging Frame (PF) is one Radio Frame and may contain one or multiple PO(s) or starting point of a PO.

. . .

The PDCCH monitoring occasions for paging within a PTW are determined as specified in clause 7.1. The UE shall not monitor PDCCH outside a PTW.

9.1.1.7     RAN PAGING

This message is sent by the NG-RAN node₁ to NG-RAN node₃ to page a UE.

Direction: NG-RAN node₁ NG-RAN node₂

| IE/Group Name | Presence | Range | IE type and reference | Semantics description | Criticality | Assigned Criticality |
|---|---|---|---|---|---|---|
| Message Type | M | | 9.2.3.1 | | YES | reject |
| CHOICE UE Identity Index Value | M | | | | YES | reject |
| >Length-10 | | | | | | |
| >>Index Length-10 | M | | BIT STRING (SIZE(10)) | Coded as specified in TS 38.304 [33] and TS 36.304 [34]. | -- | |
| UE RAN Paging Identity | M | | 9.2.3.43 | | YES | ignore |
| Paging DRX | M | | 9.2.3.66 | | YES | ignore |
| RAN Paging Area | M | | 9.2.3.38 | | YES | reject |
| Paging Priority | O | | 9.2.3.44 | | YES | ignore |
| Assistance Data for RAN Paging | O | | 9.2.3.41 | | YES | ignore |
| UE Radio Capability for Paging | O | | 9.2.3.91 | | YES | ignore |
| Paging eDRX Information | O | | 9.2.3.XX | | YES | ignore |

9.2.3.XX    Paging eDRX Information
This IE indicates the Paging eDRX parameters as defined in TS 38.304.

| IE/Group Name | Presence | Range | IE type and reference | Semantics description |
|---|---|---|---|---|
| Paging eDRX Cycle | M | - | ENUMERATED (hfhalf, hf1, hf2, hf4, hf6, hf8, hf10, hf12, hf14, hf16, hf32, hf64, hf128, hf256, ...) | TeDRX defined in TS 38.304. Unit [number of hyperframes]. |
| Paging Time Window | O | - | ENUMERATED (s1, s2, s3, s4, s5, s6, s7, s8, s9, s10, s11, s12, s13, s14, s15, s16, ...) | Unit [1.28 second]. |

9.2.3.XX    Paging eDRX Information

This IE indicates the Paging eDRX parameters as defined in TS 38.304.

| IE/Group Name | Presence | Range | IE type and reference | Semantics description |
|---|---|---|---|---|
| Paging eDRX Cycle | M | - | ENUMERATED (hfhalf, hf1, hf2, hf4, hf6, hf8, hf10, hf12, hf14, hf16, hf32, hf64, hf128, hf256, ...) | TeDRX defined in TS 38.304. Unit: [number of hyperframes]. |
| Paging Time Window | O | - | ENUMERATED (s1, s2, s3, s4, s5, s6, s7, s8, s9, s10, s11, s12, s13, s14, s15, s16, ...) | Unit: [1.28 second]. |
| Number of PTWs | O | - | ENUMERATED (1, 2, 4, 8, 16, ...) | |

-- ASN1START
-- **************************************************************
--
-- PDU definitions for XnAP.
--
-- **************************************************************
<< skip unrelated part >>
-- **************************************************************
--
-- RAN PAGING
--
-- **************************************************************
RANPaging ::= SEQUENCE {
        protocolIEs                    ProtocolIE-Container    {{RANPaging-IEs}},
        ...
}
RANPaging-IEs XNAP-PROTOCOL-IES ::= {
        { ID id-UEIdentityIndexValue           CRITICALITY reject   TYPE UEIdentityIndexValue
PRESENCE mandatory}|
        { ID id-UERANPagingIdentity            CRITICALITY ignore   TYPE UERANPagingIdentity
              PRESENCE mandatory}|
        { ID id-PagingDRX                                          CRITICALITY ignore      TYPE
PagingDRX                        PRESENCE mandatory}|
        { ID id-RANPagingArea                                     CRITICALITY reject      TYPE RANPagingArea
                 PRESENCE mandatory}|
        { ID id-PagingPriority                 CRITICALITY ignore   TYPE PagingPriority
                PRESENCE optional }|
        { ID id-AssistanceDataForRANPaging CRITICALITY ignore   TYPE AssistanceDataForRANPaging    PRESENCE optional }|
        { ID id-UERadioCapabilityForPaging CRITICALITY ignore   TYPE UERadioCapabilityForPaging    PRESENCE optional }|
        { ID id-PagingeDRXInformation          CRITICALITY ignore   TYPE PagingeDRXInformation         PRESENCE
optional },
        ...
}
<< skip unrelated part >>
PagingDRX            ::= ENUMERATED {
        v32,
        v64,
        v128,
        v256,
        ...,
        v512,
        v1024
        }
PagingeDRXInformation ::= SEQUENCE {
        paging-eDRX-Cycle              Paging-eDRX-Cycle,
        paging-Time-Window             Paging-Time-Window OPTIONAL,
        IE-Extensions                  ProtocolExtensionContainer {
{PagingeDRXInformation-ExtIEs} }    OPTIONAL,
        ...
}
PagingeDRXInformation-ExtIEs NGAP-PROTOCOL-EXTENSION ::= {
        ...
}
Paging-eDRX-Cycle ::= ENUMERATED {
        hfhalf, hf1, hf2, hf4, hf6,
        hf8, hf10, hf12, hf14, hf16,
        hf32, hf64, hf128, hf256,
        ...
}
Paging-Time-Window ::= ENUMERATED {
        s1, s2, s3, s4, s5,
        s6, s7, s8, s9, s10,
        s11, s12, s13, s14, s15, s16,
        ...
}
<< skip unrelated part >>
END
-- ASN1STOP
```

9.3.7    Constant definitions

-- ASN1START
<< skip unrelated part >>
******************************************************
  |
  |
  | -- IEs
  |
  |
******************************************************
<< skip unrelated part >>
id-duplicationActivation          ProtocolIE-ID ::= 236
id-PagingeDRXInformation          ProtocolIE-ID ::= XXX
END

-- ASN1STOP
```

BASE STATION AND WIRELESS COMMUNICATION METHOD

CROSS-REFERENCE TO RELATED APPLICATIONS

This application is a continuation application of International Patent Application No. PCT/JP2022/001214, filed Jan. 14, 2022, which designated the U.S. and claims the benefit of priority from Japanese Patent Application No. 2021-004107, filed Jan. 14, 2021. The entire disclosures of the above applications are incorporated herein by reference.

TECHNICAL FIELD

This disclosure relates to a base station and a wireless communication method.

BACKGROUND

In the 3rd Generation Partnership Project (3GPP) as an international standards organization, New Radio (NR) Release 15 as the 5th generation (5G) RAT (Radio Access Technology) is specified as a successor to Long Term Evolution (LTE) as the 3.9th generation RAT and LTE-Advanced as the 4th generation RAT, for example, Non-Patent Document 1: 3GPP TS 38.300 V15.11.0 (2020 September).

Further, considering such a terminal that power consumption is further limited in LTE (Long Term Evolution) like IoT (Internet of Things) equipment, technology called extended Discontinuous Reception (eDRX) to reduce power consumption by limiting a period capable of receiving a radio signal is introduced, for example, Non-Patent Document 2: 3GPP TS 36.300 V15.12.0 (2020 December).

SUMMARY

In the 3GPP, the consideration of functions on the assumption of a new terminal for IoT performing radio access using NR is started so far. Further, eDRX described above is included in the functions being considered. Further, unlike in LTE, it is defined in NR that a terminal transitions to a state called RRC_INACTIVE in addition to RRC_CONNECTED and RRC_IDLE states. Therefore, when the terminal is a terminal more likely to move such as a terminal mounted on a vehicle, it is also assumed in NR that the terminal transitions to the RRC_INACTIVE state while operating in the eDRX state.

In NR, when transmitting downlink data to a terminal in the RRC_INACTIVE state, RAN paging is so introduced that a base station that received the downlink data from a core network transmits paging information. However, since there is no eDRX in the NR specifications so far, a mechanism capable of realizing RAN paging when a terminal compatible with eDRX transitions to RRC_INACTIVE is not provided.

It is an object of this disclosure to provide a base station and a wireless communication method capable of performing RAN paging even when a terminal compatible with eDRX transitions to RRC_INACTIVE.

A base station according to one aspect of this disclosure includes: a control unit which controls RAN paging processing for a terminal in an RRC_INACTIVE state; and a transmitting unit which transmits, to any other base station connected by a given interface, RAN paging information elements including configuration information on eDRX (extended Discontinuous Reception) in the RAN paging processing for the terminal.

According to the one aspect of this disclosure, even when a terminal compatible with eDRX transitions to RRC_INACTIVE, the base station and a wireless communication method capable of performing RAN paging can be provided.

BRIEF DESCRIPTION OF DRAWINGS

FIG. 2 is a diagram for describing the operation of DRX upon paging.

FIG. 4 is a diagram illustrating an example of the hardware configuration of each equipment in the wireless communication system.

FIG. 8 is a diagram illustrating a specification change example of the 3GPP specifications.

FIG. 9 is a diagram illustrating a specification change example of the 3GPP specifications.

FIG. 10 is a diagram illustrating a specification change example of the 3GPP specifications.

FIG. 11 is a diagram illustrating a specification change example of the 3GPP specifications.

FIG. 12 is a diagram illustrating a specification change example of the 3GPP specifications.

FIG. 13 is a diagram illustrating a specification change example of the 3GPP specifications.

FIG. 14 is a diagram illustrating a specification change example of the 3GPP specifications.

DETAILED DESCRIPTION

Figure 1:
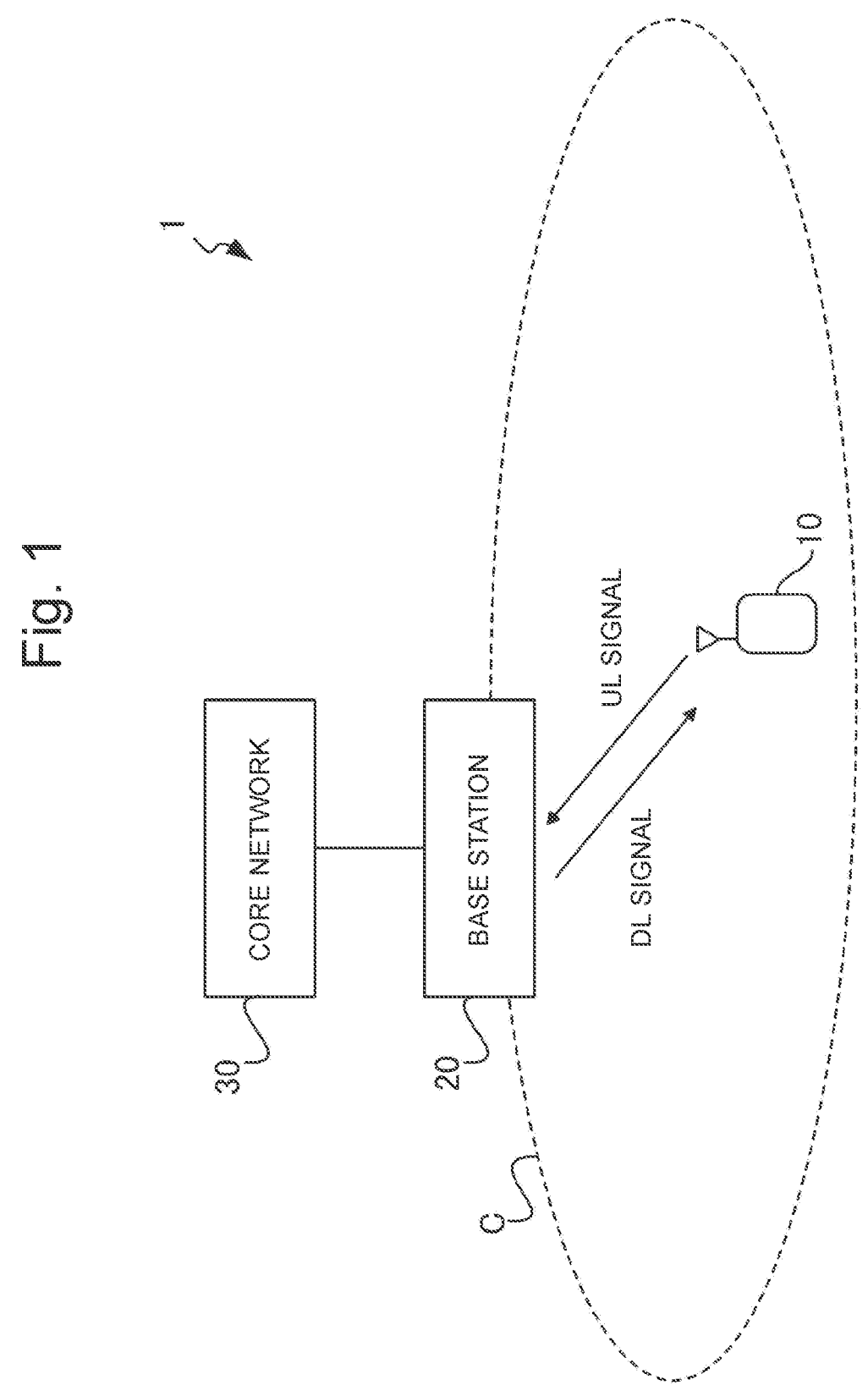
FIG. 1 is a diagram illustrating an example of a wireless communication system according to the present embodiment.

An embodiment of this disclosure will be described with reference to the accompanying drawings. Note that components to which the same reference numerals are given in respective drawings have the same or similar configurations.
System Configuration FIG. 1 is a diagram illustrating an example of the overview of a wireless communication system according to the present embodiment. As illustrated in FIG. 1, a wireless communication system 1 may include a terminal 10, a base station 20, and a core network 30. Note that the number of terminals 10 and base stations 20 illustrated in FIG. 1 is just an illustrative example, and the number is not limited to that illustrated.

As Radio Access Technology (RAT) of the wireless communication system 1, for example, NR is assumed, but it is not limited to NR, and various RATs can be utilized, such as LTE, LTE-Advanced, the 6th generation (6G) RAT or later.

The terminal 10 is a given terminal or equipment such as a smartphone, a personal computer, an in-vehicle terminal, an in-vehicle device, a stationary device, or a telematics control unit (TCU). The terminal 10 may also be called user equipment (UE), a mobile station (MS), a terminal (User Terminal), a radio apparatus, a subscriber terminal, an access terminal, or the like. The terminal 10 may be of a mobile type or a fixed type. The terminal 10 is configured communicably using NR as RAT.

Here, in NR Release 17, support for a terminal on the assumption of lower performance and price range than a terminal for enhanced Mobile Broadband (eMBB) or Ultra-reliable and Low Latency Communications (URLLC) introduced in Release 15 or 16 is being considered. Such a terminal is also called a reduced capability (RedCap) terminal or device, which is assumed to be utilized, for example, in an industrial wireless sensor, a surveillance camera (video surveillance), or a wearable device.

The RedCap terminal is assumed to have higher performance than a terminal for low power wide area (LPWA), and a carrier used by the RedCap terminal may have a bandwidth of 20 MHz, 50 MHz, or 100 MHz, for example. Note, for example, that there are Category 1, Long Term Evolution for Machine-type-communication (LTE-M) working with LTE-type RAT, and Narrow Band IoT (NB-IoT) as LPWAs. The maximum bandwidth for Category 1 is 20 MHz, the maximum bandwidth for LTE-M is 1.4 MHz (6 RB), and the maximum bandwidth for NB-IoT is 180 kHz (1 RB). Thus, the RedCap terminal is expected to be used as a middle-range terminal between use for eMBB or URLLC and use for LPWA. The RedCap terminal and a terminal for LPWA are included as the terminal 10 according to the present embodiment.

The base station 20 forms one or more cells C to communicate with the terminal 10 using each of the cells C. The cell C may also be mutually rephrased as a serving cell, a carrier, a component carrier (CC), and the like. The base station 20 may also be called a gNodeB (gNB), an en-gNB, a Next Generation-Radio Access Network (NG-RAN) node, an eNB (E-UTRAN NodeB), an ng-eNB (next-generation eNB), a low-power node, a Central Unit (CU), a Distributed Unit (DU), a gNB-DU, a Remote Radio Head (RRH), or an Integrated Access and Backhaul/Backhauling (IAB) node. The base station 20 is not limited to one node, and is composed of two or more nodes (for example, a combination of a lower node such as DU and an upper node such as CU). The base stations 20 may also be interconnected by a given interface. The given interface may be an Xn interface, an X2 interface in LTE or LTE-Advanced, or an interface for interconnection between base stations 20 defined in the 6th generation or later.

The core network 30 is, for example, an NR-compatible core network (5G Core Network: 5GC), but the core network 30 is not limited thereto. A device on the core network 30 (hereinafter, which may also be called a "core network device") performs mobility management such as paging and location registration of the terminal 10. The core network device may be connected to the base station 20 through a given interface (for example, S1 or NG interface).

The core network device includes at least one of multiple functions such as AMF (Access and Mobility Management Function) for managing information related to access and mobility management, SMF (Session Management Function) for session management, User Plane Function (UPF) for U plane transmission control, and NSSF (Network Slice Selection Function) for network slice management. Each of these functions is implemented in one or more physical or logical devices.

In the wireless communication system 1, the terminal 10 receives a downlink (DL) signal from the base station 20 and/or transmits an uplink (UL) signal. In the terminal 10, one or more carriers may be configured. The bandwidth of each carrier is, for example, in a range of 5 MHz to 400

MHz. One or more bandwidth parts (BWPs) may be configured on one carrier. One BWP has at least part of the bandwidth of the carrier.

In the description below, a physical downlink control channel (PDCCH) will be described as an example of a downlink control channel, but the downlink control channel needs only to be a channel used for transmission of downlink control information (DCI), and the name is not limited to PDCCH. Further, the downlink control information may also be DCI (Downlink Control Information) in a given format in which a cyclic redundancy check (CRC) is scrambled by a given radio network temporary identifier (RNTI), and the name is not limited to DCI.

Further, in the description below, a physical downlink shared channel (PDSCH) will be described as an example of a downlink shared channel, but the downlink shared channel needs only to be a channel used at least for transmission of paging information, and the name is not limited to PDSCH.

Conventional eDRX Technology

Here, conventional eDRX (extended DRX) technology defined in LTE will be described. In LTE, a subframe with a length of time of 1 ms, a radio frame with a length of time of 10 ms, and a hyperframe with a length of time of 10.24 seconds are defined. The position of each radio frame is represented by a number in SFN (System Frame Number) of 0 to 1023. Further, in order to manage a length of time longer than that of the 1024 radio frames, a hyperframe with a length of time of the SFN (that is, 10.24 seconds) of the 0 to 1023 radio frames is defined. The hyperframe is represented by a number in H-SFN (Hyper-SFN (System Frame Number)) of 0 to 1023.

Figure 2:
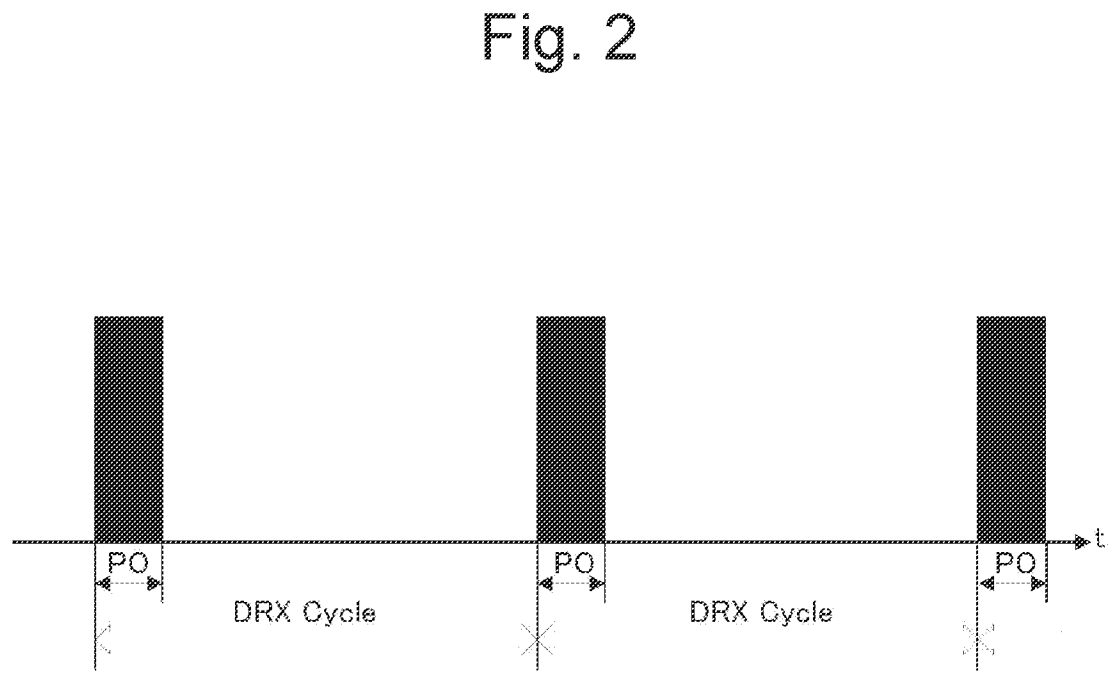

FIG. 2 is a diagram for describing the operation of DRX (Discontinuous Reception) upon paging. As illustrated in FIG. 2, the terminal 10 in RRC_IDLE monitors downlink control channel candidates (PDCCH candidates) during periods called POs (Paging Occasions) to receive paging signals. While the terminal 10 is operating according to the DRX configuration, the base station 20 transmits paging signals during the PO periods and does not transmit paging signals during the other periods. The terminal 10 that received a paging signal in each PO period establishes communication with the base station 20 and transitions to an RRC_CONNECTED state. One PO exists in each DRX cycle. The DRX cycle is a maximum of 2.56 seconds.

Figure 3:
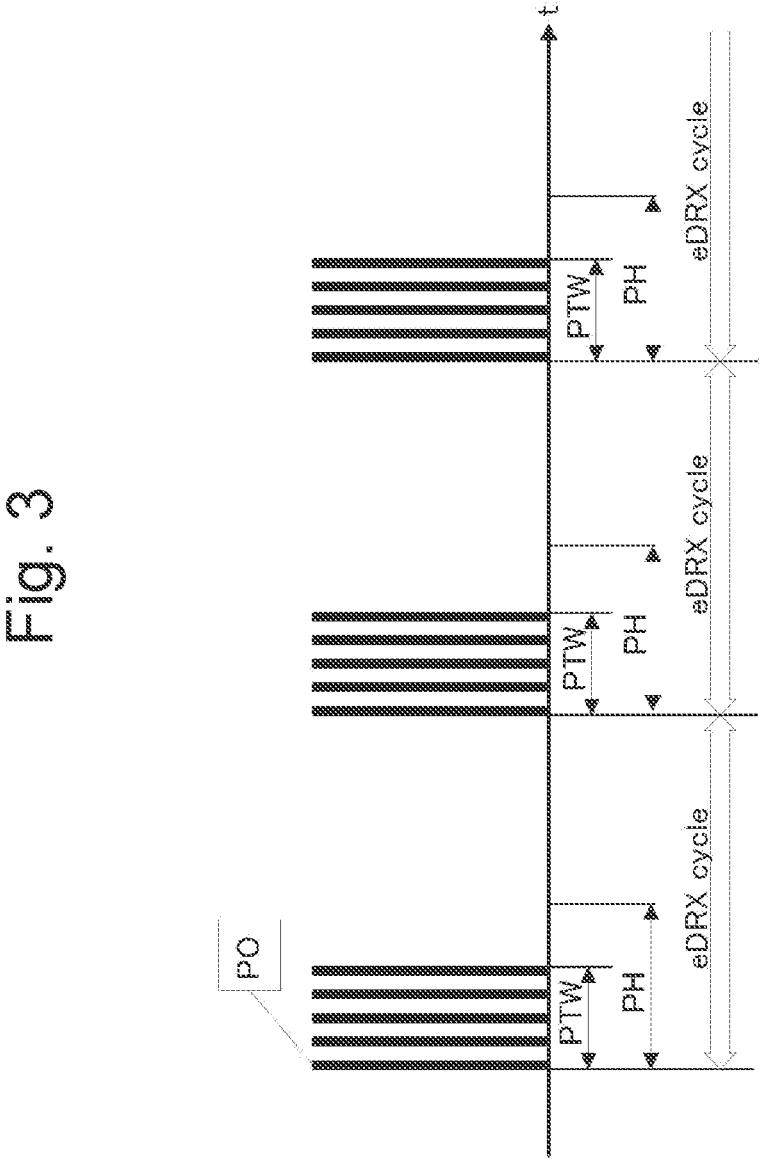
FIG. 3 is a diagram for describing the operation of eDRX upon paging.

FIG. 3 is a diagram for describing the operation of eDRX upon paging. As illustrated in FIG. 3, the terminal 10 in RRC_IDLE monitors downlink control channel candidates in PO periods within each period called a PTW (Paging Time Window) to receive paging signals. One PTW is configured in each hyperframe called a PH (Paging Hyperframe). One PH exists in each eDRX cycle. When the terminal 10 is an NB-IoT terminal, the eDRX cycle is a maximum of 2.91 hours (that is, 1024 Hyperframes), while when the terminal 10 is a terminal other than the NB-IoT terminal, the eDRX cycle is a maximum of about 44 minutes (that is, 256 Hyperframes).

While the terminal 10 is operating according to the eDRX configuration, the base station 20 transmits a paging signal in each PTW period and each PO period, and does not transmit any paging signal in the other periods. The terminal 10 that received the paging signal establishes communication with the base station 20, and transitions to the RRC_CONNECTED state.

Here, the PH is an H-SFN that satisfies Formula 1 below.

$$\text{H-SFN mod } T_{eDRX,H} = (\text{UE\_ID\_H mod } T_{eDRX,H}), \qquad \text{Formula 1:}$$

where $T_{eDRX,H}$ indicates the eDRX cycle, which is configured with a length of an integral multiple of the Hyperframe. The UE_ID_H is 10 or 12 most significant bits of a hashed ID defined based on S-TMSI (SAE Temporary Mobile Subscriber Identity) or 5G-S-TMIS (5G S-Temporary Mobile Subscriber Identity).

The SFN as the start position of the PTW (PTW_start) (start timing) is expressed by Formula 2 and Formula 3 below.

$$SFN=256*i_{eDRX} \qquad \text{Formula 2:}$$

$$i_{eDRX}=\text{floor}(UE\_ID\_H/T_{eDRX,H})\text{mod } 4 \qquad \text{Formula 3:}$$

The SFN as the end position of the PTW (PTW_end) (end timing) is expressed by Formula 4 below.

$$SFN=(PTW\_start+L*100-1)\text{mod } 1024, \qquad \text{Formula 4:}$$

where L denotes the time length of the PTW (Paging Time Window length), which is configured on the terminal 10 by a message of an upper layer (RRC (Radio Resource Control) or NAS (Non Access Stratum)).

Problems in Realizing eDRX in NR

When eDRX is applied to NR, the following problems are considered. First, in the case of eDRX in LTE, possible values as the start position of the PTW are limited to four. Specifically, according to Formula 2 and Formula 3 above, since possible values of $i_{eDRX}$ are 0, 1, 2, and 3, the start position of the PTW is limited to four, that is, SFN=0, 256, 512, 768. However, NR is so designed that various configurations required for wireless communication can be made more flexibly than LTE. Therefore, when eDRX is realized in NR, it is considered that the PTW start position should be made configurable more flexibly than that in LTE (First Problem).

Next, in NR, an area in which the terminal 10 monitors PDCCH candidates is called a search space. As the search space, a common search space (CSS) configured to be common to respective terminals 10, and a UE specific Search Space (USS) configured dedicatedly for each terminal 10 are defined.

In NR, the search space can be configured for each BWP, but in the 3GPP specifications, it is explicitly defined that the terminal 10 does not monitor any control channel candidate in a BWP with no search space configured therein. However, since no eDRX is defined in NR, there is of course no definition of how the terminal 10 should operate during each period other than the PO periods. In view of this situation, it is considered that a specific definition of a mechanism for the terminal 10 to monitor radio signals according to the DRX configuration is required to realize eDRX in NR (Second Problem).

Next, in NR, a new RRC state called RRC_INACTIVE is defined. Like RRC_IDLE, RRC_INACTIVE can save power of the terminal 10, but unlike RRC_IDLE, an RRC context and a NAS context are held among the terminal 10, the base station 20, and the core network 30. Further, a RAN notification area (RNA) as an area obtained by subdividing a TA (Tracking Area) is defined, and the base station 20 manages the RAN notification area in which the terminal 10 exits. Further, technology called "RAN paging" for performing paging in units of RAN notification areas used to call the terminal 10 in the RRC_INACTIVE state is introduced.

In RAN paging, all paging signals are transmitted at once from two or more base stations 20 that configure each RAN notification area in which the terminal 10 exists. Therefore, each base station 20 needs to share various information required for the RAN paging with the other base stations 20 that configure the same RAN notification area.

When the terminal 10 is a terminal likely to move such as the RedCap terminal 10 mounted on a vehicle, it is assumed that the terminal 10 transitions to the RRC_INACTIVE state while operating in eDRX. Therefore, even when the terminal 10 compatible with the eDRX transitions to RRC_INAC-TIVE, a mechanism to enable RAN paging processing in consideration of eDRX is required to realize eDRX in NR (Third Problem).

Overview of Present Embodiment

In the wireless communication system according to the present embodiment, a possible number as the PTW start position is made configurable to any number in order to solve the first problem. Further, in order to solve the second problem, the terminal 10 with eDRX configured thereon operates to monitor control channel candidates in each paging common search space between PTWs, and operates not to monitor any control channel candidate in the common search space during periods other than the PTWs. Further, in order to solve the third problem, the Xn interface is used to be able to notify configuration information on eDRX from each base station 20 (first base station) to any other base station 20 (second base station) when performing RAN paging.

In the present embodiment, configuration information necessary to achieve eDRX operation, such as the eDRX cycle and the time length of the PTW (length of the reception period) is called "configuration information on eDRX." Further, in the following description, the term "configuration information on eDRX" may mean only the configuration information on eDRX such as the eDRX cycle and the time length of the PTW unless otherwise noted, or may mean to include configuration information necessary to achieve DRX operation such as the configuration of the DRX cycle and the PO position in addition to the configuration information on eDRX.

Hardware Configuration

Figure 4:
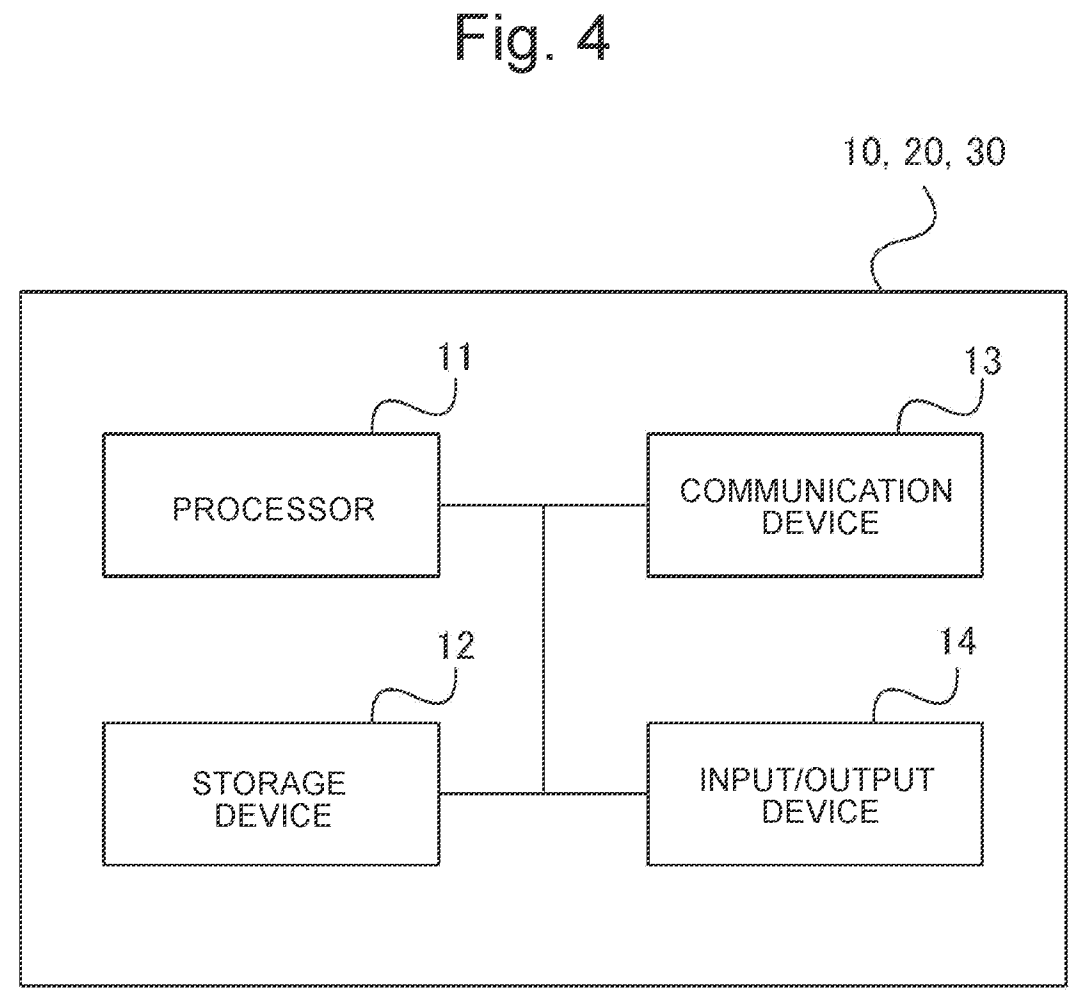

FIG. 4 is a diagram illustrating an example of the hardware configuration of each equipment in the wireless communication system. Each equipment in the wireless communication system 1 (for example, the terminal 10, the base station 20, or the core network 30) includes a processor 11, a storage device 12, a communication device 13 for performing wired or wireless communication, and an input/output device 14 for accepting various input operations and outputting various information.

The processor 11 is, for example, a CPU (Central Processing Unit) to control each equipment in the wireless communication system 1. The processor 11 may read a program from the storage device 12 to perform various processing to be described in the present embodiment. Each equipment in the wireless communication system 1 may also be configured to include one or more processors. Further, each equipment concerned may also be called a computer.

The storage device 12 is composed, for example, of storages such as a memory, an HDD (Hard Disk Drive), and/or an SSD (Solid State Drive). The storage device 12 may also store various information required to perform processing by the processor 11 (for example, programs and the like executed by the processor 11).

The communication device 13 is a device for performing communication through wired and/or wireless networks, which may include a network card, a communication module, a chip, an antenna, and the like, for example. Further, an amplifier, an RF (Radio Frequency) device for performing processing on radio signals, and a BB (BaseBand) device for performing processing on baseband signals may be included in the communication device 13.

The RF device performs D/A conversion, modulation, frequency conversion, power amplification, and the like on a digital baseband signal, for example, received from the BB device to generate a radio signal to be transmitted from the antenna. Further, the RF device performs frequency conversion, demodulation, A/D conversion, and the like on a radio signal received from the antenna to generate and transmit a digital baseband signal to the BB device. The BB device performs processing for converting the digital baseband signal to a packet and processing for converting the packet to a digital baseband signal.

The input/output device 14 includes input devices such as a keyboard, a touch panel, a mouse, and/or a microphone, and output devices such as a display and/or a speaker.

Note that the hardware configuration described above is just an example. In each equipment inside the wireless communication system 1, part of hardware illustrated in FIG. 4 may be omitted, or any other hardware unillustrated in FIG. 4 may be included. Further, the hardware illustrated in FIG. 4 may be configured by one or more chips.

Functional Configuration

Terminal

Figure 5:
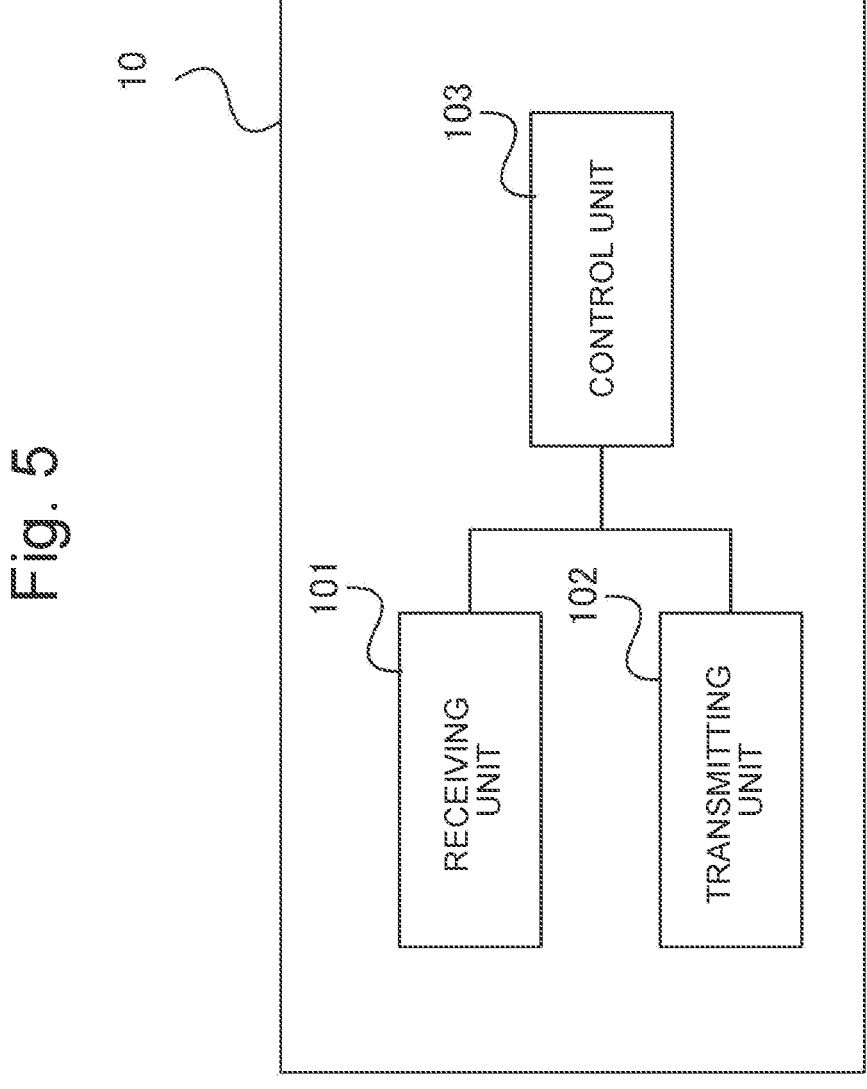
FIG. 5 is a diagram illustrating an example of the functional configuration of a terminal.

FIG. 5 is a diagram illustrating an example of the functional configuration of the terminal 10. The terminal 10 includes a receiving unit 101, a transmitting unit 102, and a control unit 103. All or some of the functions implemented by the receiving unit 101 and the transmitting unit 102 can be realized by using the communication device 13. Further, all or some of the functions implemented by the receiving unit 101 and the transmitting unit 102, and the function of the control unit 103 can be realized by the processor 11 executing a program stored in the storage device 12. Further, the program can be stored on a storage medium. The storage medium with the program stored thereon may be a non-transitory computer readable medium. The non-transitory storage medium is not particularly limited but may be a storage medium such as a USB memory or a CD-ROM.

The receiving unit 101 receives downlink signals. The receiving unit 101 may also receive information and/or data transmitted through each downlink signal. Here, for example, the verb "receive" may also include the meaning of performing processing related to reception including at least one of the reception, demapping, demodulation, decoding, monitoring, and measurement of a radio signal.

Further, the receiving unit 101 receives, from the base station 20, the configuration information on eDRX and/or configuration information on the common search space.

The transmitting unit 102 transmits uplink signals. The transmitting unit 102 may also transmit information and/or data to be transmitted through each uplink signal. Here, for example, the verb "transmit" may also include the meaning of performing processing related to transmission including at least one of the encoding, modulation, mapping, and transmission of a radio signal.

The control unit 103 performs various processing on eDRX based on the configuration information on eDRX received at the receiving unit 101. Further, based on configuration information on eDRX, the control unit 103 performs control to monitor control channel candidates in each PTW (reception period) within each PH (given H-SFN) (controls the reception of downlink control information).

Base Station

Figure 6:
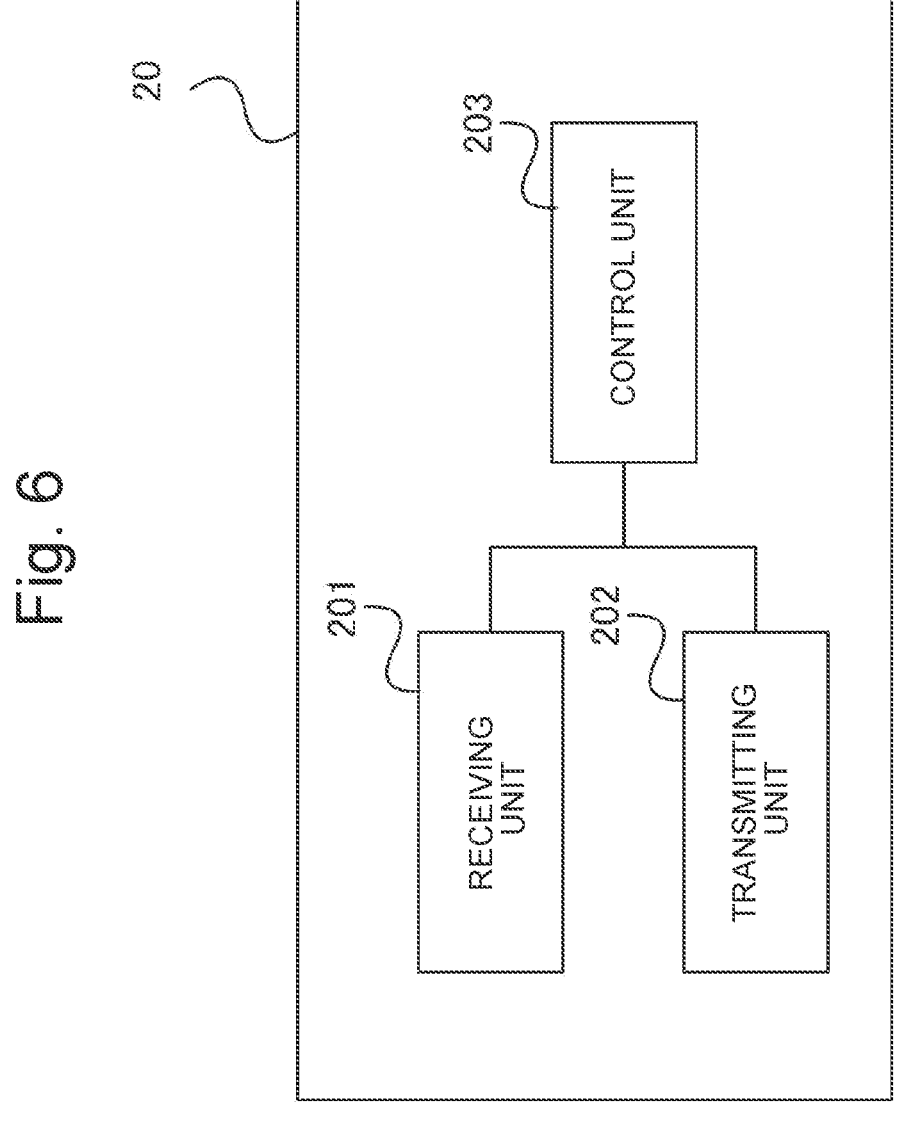
FIG. 6 is a diagram illustrating an example of the functional configuration of a base station.

FIG. 6 is a diagram illustrating an example of the functional configuration of the base station 20. The base station 20 includes a receiving unit 201, a transmitting unit 202, and a control unit 203. All or some of the functions implemented by the receiving unit 201 and the transmitting unit 202 can be realized by using the communication device 13. Further, all or some of the functions implemented by the receiving unit 201 and the transmitting unit 202, and the function of the control unit 103 can be realized by the processor 11 executing a program stored in the storage device 12. Further, the program can be stored on a storage medium. The storage medium with the program stored thereon may be a non-transitory computer readable medium. The non-transitory storage medium is not particularly limited but may be a storage medium such as a USB memory or a CD-ROM.

The receiving unit 201 receives uplink signals. The receiving unit 201 may also receive information and/or data transmitted through each of the above-mentioned uplink signals. Further, the receiving unit 201 receives, from the core network 30, the configuration information on eDRX. Further, the receiving unit 201 uses the Xn interface to receive various information from any other base station 20. For example, the receiving unit 201 receives, from any other base station, RAN paging information elements including the configuration information on eDRX.

The transmitting unit 202 transmits downlink signals. The transmitting unit 202 may also transmit information and/or data to be transmitted through each of the above-mentioned downlink signals. Further, the transmitting unit 202 uses the Xn interface to transmit various information to any other base station 20. Further, the transmitting unit 202 transmits, to the terminal 10, the configuration information on eDRX and/or configuration information on the common search space.

Further, the transmitting unit 202 transmits various information to any other base station 20. For example, when RAN paging processing is performed on the terminal 10 in the RRC_INACTIVE state, the transmitting unit 202 transmits RAN paging information elements including the configuration information on eDRX to any other base station 20.

The control unit 203 controls RAN paging processing for the terminal 10 in the RRC_INACTIVE state. Further, the control unit 203 performs control to transmit downlink control information in each PTW (reception period) within each PH (given H-SFN) indicated by the configuration information on eDRX.

Processing Procedure for Realizing eDRX in NR

Sequence

Figure 7:
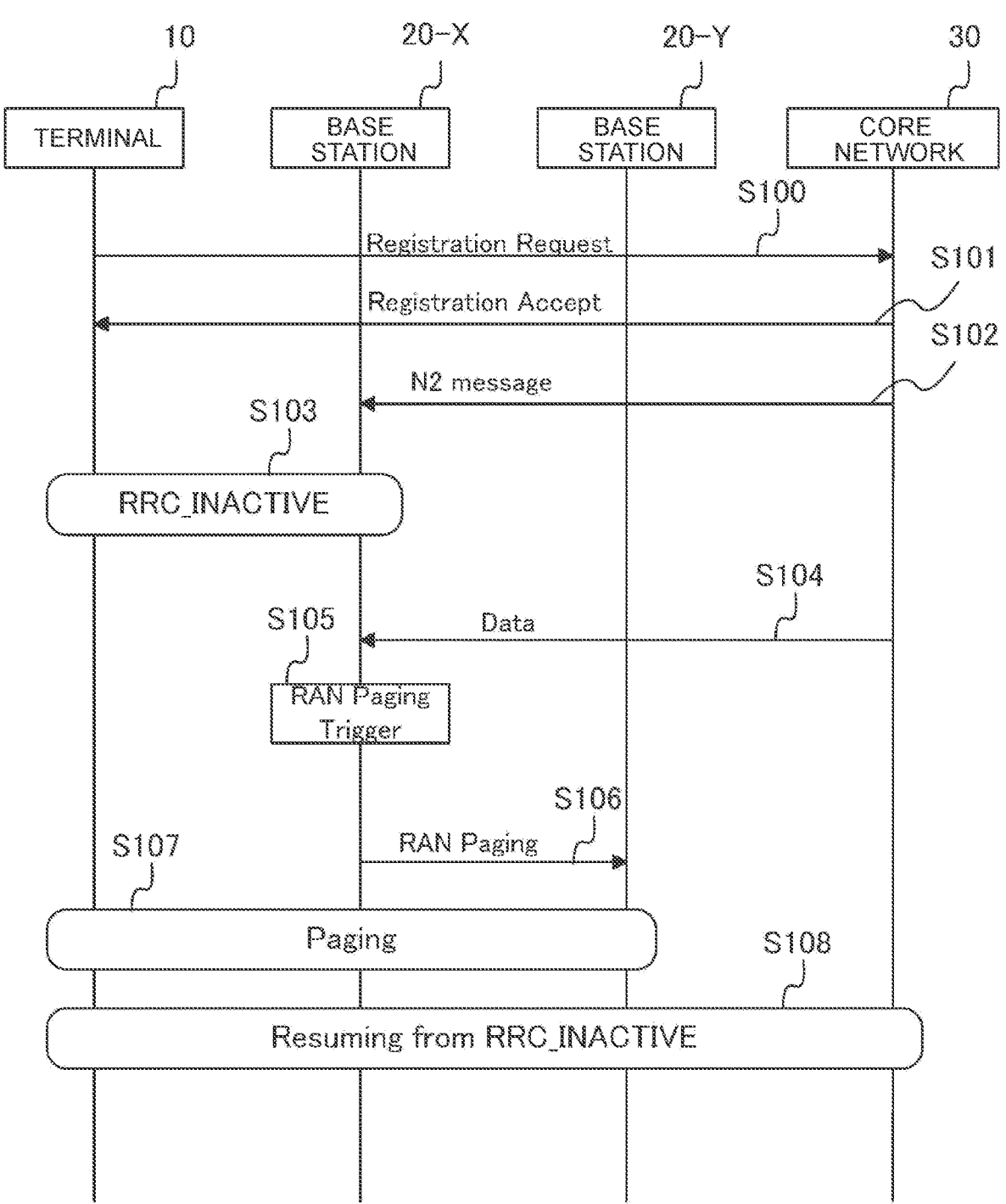
FIG. 7 is a sequence diagram illustrating an example of a processing procedure related to eDRX.

FIG. 7 is a sequence diagram illustrating an example of a processing procedure related to eDRX. In FIG. 7, it is assumed that a base station 20-X and a base station 20-Y configure the same RAN notification area.

In step S100, the terminal 10 transmits a Registration Request to the core network 30 through a base station 20. Here, it is assumed that the terminal 10 transmits the Registration Request through the base station 20-X.

In step S101, the core network 30 (for example, AMF) transmits a Registration Accept to the terminal 10 through the base station 20-X. In a Registration Accept message, the configuration information on eDRX to be configured on the terminal 10 is included. The terminal 10 stores the received configuration information on eDRX in the storage device 12. The Registration Request and Registration Accept are also called NAS messages.

Note that the configuration information on eDRX is not limited to that in the processing procedure of step S100 and step S101, which may also be configured on the terminal 10 in any other way. For example, the configuration information on eDRX may also be configured on the terminal 10 using RRC messages (for example, RRC Setup, RRC Reconfiguration, RRC Reestablishment, or the like), rather than the NAS messages.

In step S102, the base station 20-X receives, from the core network 30, an N2 message including the configuration information on eDRX configured on the terminal 10. Note that the N2 message means a message used in an interface (N2 interface) between the base station 20 and the core network 30. For example, the N2 message may also be an Initial context setup message, a UE context modification message, a Handover resource allocation message, or a Path switch request message. Further, the configuration information on eDRX may be part of Core Network Assistance Information on RRC_INACTIVE.

In step S103, the terminal 10 transitions to the RRC_I-NACTIVE state. In the RRC_INACTIVE state, the RRC context (AS context) related to terminal 10 is held in the terminal 10 and the base station 20-X.

In step S104, the core network 30 (for example, UPF) transmits, to the base station 20-X, downlink data (user plane data or downlink signaling) to be transmitted to the terminal 10.

In step S105, although the base station 20-X receives the downlink data to be transmitted to the terminal 10, since the terminal 10 is in the RRC_INACTIVE state, the base station 20-X detects that an event to trigger RAN paging has occurred.

In step S106, the base station 20-X transmits RAN paging information to any other base station 20 (here, the base station 20-Y) corresponding to the same RAN notification area as that of the base station 20-X. The other base station 20 concerned may also be called a base station 20 corresponding to the RAN notification area in which the terminal 10 exists. Further, the base station 20-X includes, in the RAN paging information, the configuration information on eDRX received in the processing procedure of step S102 and transmits the RAN paging information.

In step S107, the base station 20-X and the base station 20-Y transmit paging information to the terminal 10. Here, the base station 20-X and the base station 20-Y transmit the paging information in each PTW period (more specifically, in each PO period that exists in the PTW period) according to the configuration information on eDRX. Further, the base station 20-X and the base station 20-Y do not transmit the paging information in any period other than the PTW period. The fact that each base station 20 transmits the paging information in the PTW period more specifically means that the base station 20 transmits downlink control information indicative of a resource position of the physical downlink shared channel to which the paging information is transmitted in the common search space in the PTW period.

In step S108, the terminal 10 monitors control channel candidates in the search space in each PTW period within each PH (more specifically, in each PO period in the PTW period) according to the configuration information on eDRX configured on the terminal 10. When downlink control information corresponding to the paging information is detected by monitoring the control channel candidates inside the search space, the terminal 10 demodulates and decodes the physical downlink shared channel according to the downlink control information to receive the paging information.

Here, plural common search spaces to be described below are defined in NR, and configuration information on these common search spaces is transmitted to (configured on) the terminal 10 from the base station 20 using system information or an dedicated RRC message (RRC Setup, RRC Reconfiguration, RRC Reestablishment, or the like).

A common search space to which downlink control information indicative of a radio resource in which SIB1 (System Information Block 1) is arranged is transmitted (Type0-PDCCH CSS set)

A common search space to which downlink control information indicative of a radio resource in which system information other than that of SIB1 (SIB2, SIB3, or the like) is arranged (Type0A-PDCCH CSS set)

A common search space to which downlink control information used for the reception of message 1 in a random access procedure is transmitted (Type1-PDCCH CSS set)

A common search space to which downlink control information indicative of a radio resource in which paging information is arranged is transmitted (Type2-PDCCH CSS set)

A common search space to which downlink control information indicative of a radio resource in which normal data such as user data are arranged is transmitted (Type3-PDCCH CSS set)

In other words, the base station 20 transmits, in each PTW period within each PH indicated by the configuration information on eDRX, a downlink control signal in a paging search space (Type2-PDCCH CSS set) among the plural common search spaces indicated by the configuration information on the common search spaces. Further, the terminal 10 monitors control channel candidates in the paging search space (Type2-PDCCH CSS set), among the plural common search spaces indicated by the configuration information on the common search spaces, in the PTW period within the PH indicated by the configuration information on eDRX.

Further, the base station 20 may not transmit downlink control information inside the paging search space in periods other than PTW within the PH. Further, the terminal 10 may not monitor the control channel candidates inside the paging search space in periods other than PTW within the PH. The battery consumption of the terminal 10 can be reduced by not monitoring the control channel candidates inside the paging search space in periods other than PTW within the PH.

Note that, in the present embodiment, a new paging common search space may also be so defined that a search space period is changed to be identical to that in the eDRX configuration. Specifically, a new paging common search space in which each PO period that exists in each PTW period is used as a search space may be so defined that the terminal 10 monitors control channel candidates according to the configuration of the new common search space. The configuration of the new common search space may also be notified to the terminal 10 by using an RRC message or a NAS message.

Configuration of eDRX

Plural specific examples of the configuration information on eDRX in the processing procedure of step S101, step S102, step S106, step S107, and step S108 in FIG. 7 will be described.

Specific Example 1 of Configuration Information

The wireless communication system according to the present embodiment may also perform the same eDRX operation as that of LTE. In other words, the PH may be determined according to Formula 1, the starting position of the PTW may be determined according to Formula 2 and Formula 3, and the ending position of the PTW may be determined according to Formula 4. In this case, the eDRX cycle ($T_{eDRX,H}$ in Formula 1 and Formula 3) and the time length of the PTW (L in Formula 4) are included in the configuration information on eDRX. For example, in the processing procedure of step S106, the base station 20-X includes in the RAN paging information, the configuration information on eDRX including information indicative of the eDRX cycle and the time length of the PTW and transmits the RAN paging information.

Specific Example 2 of Configuration Information

The wireless communication system according to the present embodiment may also include given information on the configuration of the PTW starting position in the configuration information on eDRX to be able to configure the PTW starting position more flexibly than that in LTE.

For example, it may be assumed that information indicative of the number of PTW starting positions within each PH (the number of SFNs that can be configured as the start SFNs of PTWs) is included in the given information on the configuration of the PTW starting position, and that the PTW starting position is determined by inputting information indicative of the number of PTW starting positions within each PH to given formulas. The given formulas may be Formula 5 and Formula 6 below. Further, the PTW ending position may be determined according to Formula 4 like in LTE.

$$SFN = (1024 \ div \ N_{PTW}) * i_{eDRX} \qquad \text{Formula 5:}$$

$$i_{eDRX} = floor(UE\_ID\_H/T_{eDRX,H}) \bmod N_{PTW} \qquad \text{Formula 6:}$$

In Formula 5 and Formula 6, $N_{PTW}$ is information indicative of the number of PTW starting positions in the PH. For example, when $N_{PTW}=8$, since possible values of $i_{eDRX}$ are 0 to 7, the PTW starting position is any one of 8 values of SFN=0, 128, 256, 384, 512, 640, 768, 896. Note that, when $N_{PTW}=4$, Formula 5 and Formula 6 are the same as Formula 2 and Formula 3, respectively. In other words, the PTW starting position can be configured more flexibly than that in LTE by utilizing Formula 5 and Formula 6.

When the PTW starting position is determined according to Formula 5 and Formula 6, and the PTW ending position is determined according to Formula 4, the eDRX cycle ($T_{eDRX,H}$ in Formula 6), the time length of the PTW (L in Formula 4), and the number of PTW starting positions within each PH ($N_{PTW}$ in Formula 5) are included in the configuration information on eDRX. For example, in the processing procedure of step S101, the terminal 10 receives a NAS message or an RRC message with the configuration information on eDRX including the information indicative of the eDRX cycle, the time length of the PTW, and the number of PTW starting positions within the PH (given information on the configuration of the PTW starting position). Further, in the processing procedure of step S106, the base station 20-X includes, in the RAN paging information, the configuration information on eDRX including the information indicative of the eDRX cycle, the time length of the PTW, and the number of PTW starting positions within each PH (given information on the configuration of the PTW start position) and transmits the RAN paging information.

Specific Example 3 of Configuration Information

In the wireless communication system according to the present embodiment, the given information on the configuration of the PTW starting position may also include information for specifying a radio frame indicative of the starting position of the PTW. For example, the information for specifying a radio frame indicative of the starting position of the PTW may be information for specifying a specific radio frame number indicative of the starting position of the PTW such as SFN=0 or SFN=64. Further, information for specifying a radio frame indicative of the ending position of the PTW (for example, SFN=64, or SFN=128) may be included in the configuration information on eDRX. Thus, the ending position of the PTW can be configured flexibly.

In this case, in the configuration information on eDRX, information for specifying each eDRX cycle and a radio frame indicative of each PTW starting position, and information for specifying a radio frame indicative of each PTW ending position are included. For example, in the processing procedure of step S101, the terminal 10 receives an NAS message or an RRC message with the configuration information on eDRX including the eDRX cycle, the information for specifying the radio frame indicative of the PTW starting position, and the information for specifying the radio frame indicative of the PTW ending position. Further, in the processing procedure of step S106, the base station 20-X includes, in the RAN paging information, the configuration information on eDRX including the eDRX cycle, the information for specifying the radio frame indicative of the PTW starting position, and the information for specifying the radio frame indicative of the PTW ending position and transmits the RAN paging information.

Specification Change Examples

FIG. 8 to FIG. 14 are diagrams illustrating specification change examples of the 3GPP specifications. Underlined parts in FIG. 8 and FIG. 9 indicate specification change examples related to the operation of the terminal 10 described in the processing procedure of step S108 of FIG. 7.

FIG. 10 indicates a specification change example when paging eDRX information as the configuration information on eDRX is added to the RAN paging information described in the processing procedure of step S106 of FIG. 7. FIG. 11 and FIG. 12 indicate specific examples of eDRX parameters included in the paging eDRX information. FIG. 11 corresponds to Specific Example 1 of the configuration information, and FIG. 12 corresponds to Specific Example 2 of the configuration information.

In FIG. 11 and FIG. 12, "Paging eDRX Cycle" corresponds to the eDRX cycle, and "Paging Time Window" corresponds to the time length of the PTW. Further, "Number of PTWs" in FIG. 12 corresponds to the number of PTW starting positions within each PH.

Figure 14:
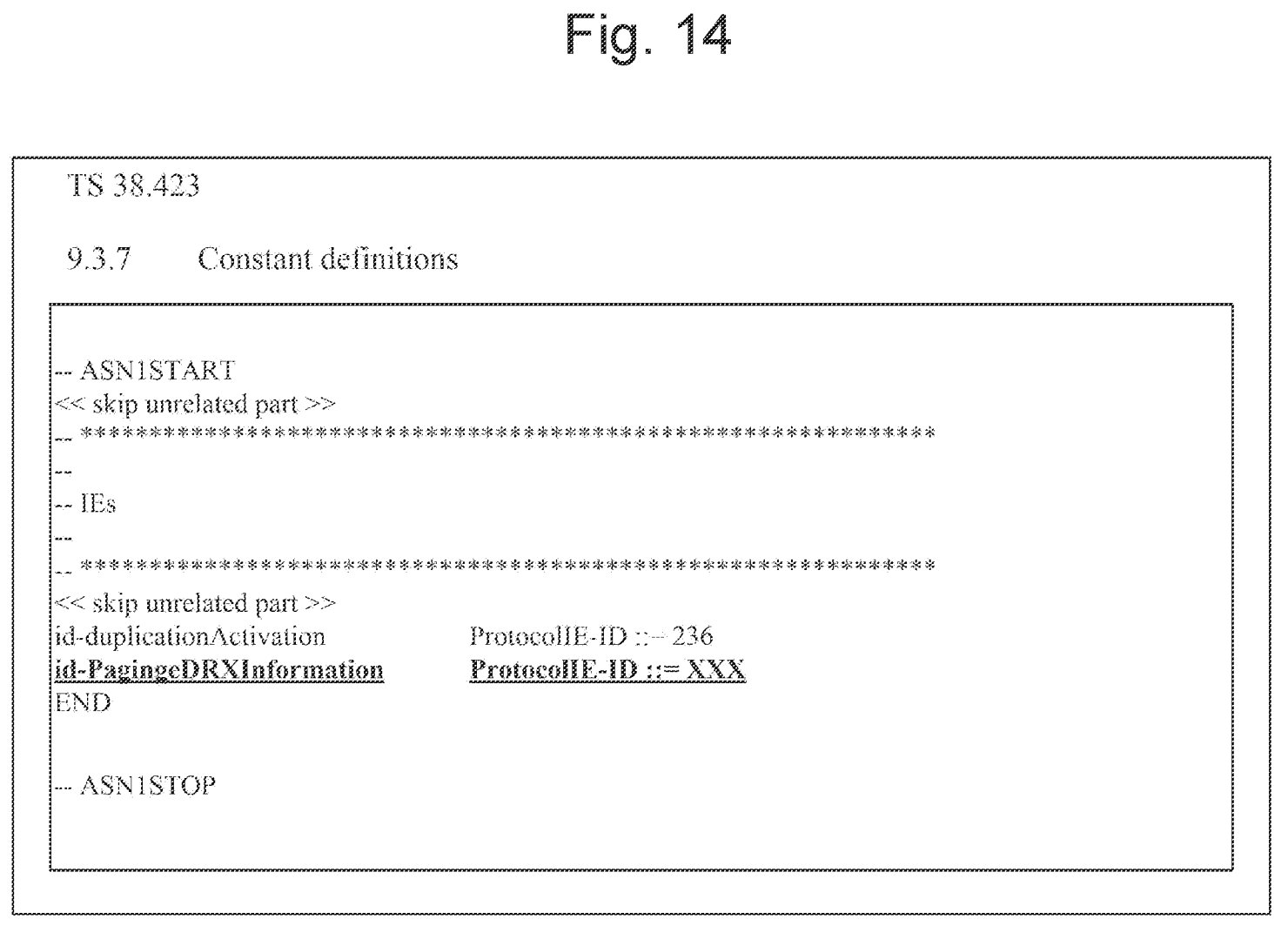

FIG. 13 indicates a format example of the paging eDRX information. The format indicated in FIG. 13 includes the eDRX parameters indicated in FIG. 11. FIG. 13 and FIG. 14 indicate specification change examples when a protocol ID of the paging eDRX information is defined.

CONCLUSION

According to the embodiment described above, a possible number as the number of PTW starting positions can be configured to any number to solve the First Problem. Thus, the operation configuration on eDRX can be performed more flexibly. Further, to solve the Second Problem, the terminal 10 in which eDRX is configured to operate to monitor each paging common search space between PTWs, and not to monitor the common search space in any other periods other than the PTWs. Thus, when eDRX is introduced in NR, each terminal can perform monitoring operation properly. Further, the power consumption of the terminal 10 can be reduced. Further, to solve the Third Problem, the configuration information on eDRX is made notifiable from the base station 20 to any other base station 20 upon RAN paging. Thus, even when the terminal compatible with eDRX transitions to RRC_INACTIVE, RAN paging can be performed.

Other Embodiments

In the aforementioned embodiment, to "monitor control channel candidates in a paging search space" may also be represented to "monitor control channel candidates in a search space set configured by search space information for paging (paging Search Space)."

In the aforementioned embodiment, an example of a first time unit may be one hyperframe (10.24 sec), an example of a second time unit may be one radio frame (10 ms), and an example of a third time unit may be one subframe (1 ms). Further, it may be defined that the second time unit is shorter in time than the first time unit, and the third time unit is shorter in time than the second time unit. Further, an example of a number indicative of each position of the second time unit cyclically repeated may be an SFN, and an example of a number indicative of each position of the first time unit cyclically repeated may be an H-SFN. For example, the H-SFN may also be represented as a first time interval of a position indicated by a given number among cyclically repeated first time intervals. Further, the PH may be configured in plural hyperframes among 0 to 1023 in H-SFN.

Various signals, information, and parameters in the aforementioned embodiment may be signaled in any layer. In other words, the various signals, information, and parameters mentioned above may also be replaced with signals, information, and parameters in any layer such as the upper layer (for example, NAS layer, RRC layer, MAC layer, or the like), the lower layer (for example, physical layer), or the like. Further, the notification of the given information is not limited to be explicit notification, which may also be implicit notification (for example, by not notifying the information or using any other information).

Further, the names of various signals, information, parameters, IE, channels, time units, and frequency units are just illustrative examples in the aforementioned embodiment, and the names may be replaced with other names. For example, each slot may be any other name as long as it is a time unit having a given number of symbols. Further, RB may be any other name as long as it is a frequency unit having a given number of subcarriers.

Further, the applications of the terminal 10 in the aforementioned embodiment (for example, for RedCap, IoT, and the like) are not limited to those exemplified, and the terminal 10 may also be used for any other purpose (for example, for eMBB, URLLC, Device-to-Device (D2D), Vehicle-to-Everything (V2X), or the like) as long as it has similar functions.

Further, the format of various information is not limited to that in the aforementioned embodiment, and it may be changed accordingly such as to bit representation (0 or 1), Boolean (true or false), Integer values, or characters. Further, the singular and the plural in the aforementioned embodiment may be mutually changed.

The embodiment described above is to facilitate the understanding of this disclosure, and it is not intended to limit the interpretation of this disclosure. The flowchart or the sequence described in the embodiment, and the alignment and arrangement of respective elements, indexes, conditions, and the like included in the embodiment are not limited to those exemplified, and can be changed accordingly. Further, at least some of components described in the aforementioned embodiment can be partially replaced or combined.

What is claimed is:

1. A base station comprising:
a memory storing a program; and
at least one processor that, by executing the program stored in the memory, is configured to:
control a radio access network (RAN) paging processing for a terminal in a radio resource control inactive (RRC_INACTIVE) state with an extended discontinuous reception (eDRX) cycle longer than 10.24 seconds;
receive, from any other base station, RAN paging information including information indicative of an eDRX cycle and information indicative of a hashed user equipment identity (UE_ID_H), the eDRX cycle being in hyper frames; and
calculate a start position of a paging time window in a hyper-system frame number (H-SFN) based on the eDRX cycle and the UE_ID_H and calculate an end position of the paging time window in the H-SFN based on the start position.

2. The base station according to claim 1, wherein the other base station is associated with the same RAN notification area as the base station.

3. The base station according to claim 1, wherein the at least one processor is further configured to:
receive the RAN paging information from a core network device.

4. The base station according to claim 1, wherein the base station is an E-UTRAN NodeB (eNB) connected to a 5th Generation (5G) core network.

5. The base station according to claim 1, wherein the other base station is connected by an Xn interface.

6. The base station according to claim 1, wherein the at least one processor is further configured to calculate the start position by calculating floor (UE_ID_H/eDRX cycle) mod 8.

7. A terminal comprising:
a memory storing a program; and
at least one processor that, by executing the program stored in the memory, is configured to:
communicate with a first base station;
in a case of transitioning to a radio resource control inactive (RRC_INACTIVE) state,
receive configuration information for an extended discontinuous reception (eDRX) from the first base station, the configuration information including information indicative of an eDRX cycle in hyper frames and information indicative of a length of a paging time window, the eDRX cycle being longer than 10.24 seconds;
in a case of radio access network (RAN) paging trigger event occurs,
calculate a start position of the paging time window in a hyper-system frame number (H-SFN) based on the eDRX cycle and a hashed user equipment identity (UE_ID_H) and calculate an end position of the paging time window in the H-SFN based on the start position and the length; and
monitor a paging message from a second base station according to the start position and the end position.

8. The terminal according to claim 7, wherein the at least one processor is further configured to calculate the start position by calculating floor (UE_ID_H/eDRX cycle) mod 8.

\* \* \* \* \*